United States Patent

[11] 3,587,673

[72] Inventors Vladimir Ivanovich Smirnov;
Edvard Grigorievich Danilov; Grigory
Evseevich Ariev; Maria Fedorovna
Kovalenko; Konstantin Andreevich
Shtyryaev; Konstantin Dmitrievich
Smirnov; Pavel Pavlovich Kush; Jury
Vyacheslavovich Petrov; Anatoly
Vasilievich Belozerov; Viktor Vasilievich
Burekhin, U.S.S.R.
[21] Appl. No. 725,710
[22] Filed May 1, 1968
[45] Patented June 28, 1971
[73] Assignee Leningradskoe Electromashinostroitelnoe
Obiedinenie "Electrosila" IM.S.M. Kirova
Leningrad, U.S.S.R.

[54] INSTALLATION FOR CUTTING ELECTRIC WIRES
AND SKINNING ELECTRIC WIRE ENDS
10 Claims, 5 Drawing Figs.
[52] U.S. Cl. .................................................. 140/1

[51] Int. Cl. ........................................... B21f 21/00,
B21f 11/00
[50] Field of Search .......................................... 140/1;
81/9.51; 83/318, 320; 51/75, 80 (A), (Inquired)

[56] References Cited
UNITED STATES PATENTS
2,307,046  1/1943  Johnson et al. ............... 140/1
3,237,829  3/1966  Muntwyler .................... 83/320

Primary Examiner—Lowell A. Larson
Attorney—Waters, Roditi & Schwartz

ABSTRACT: Apparatus is provided for skinning and cutting an insulated wire as the wire is continuously fed. The apparatus includes a skinning device for removing portions of insulation from the wire. This is accomplished by brushes brought selectively into engagement with the moving wire. The apparatus further includes a wire-severing device that moves parallel to the direction of feed of the wire so that the wire can be severed as the wire is continuously fed.

INSTALLATION FOR CUTTING ELECTRIC WIRES AND SKINNING ELECTRIC WIRE ENDS

The present invention relates to semiautomatic installations for cutting and skinning electrical wire ends.

The application of the present invention proves to be most advantageous at factories which produce large-sized electric machines, and especially turbo- and hydraulic generators.

Moreover, the installation being disclosed can find utility when employed in wire-laying and repair jobs, where skinned wire ends are required.

The installation can likewise be made use of for straightening and cutting reinforcing wires when dealing with jobs involving reinforced concrete, as well as in manufacturing welding electrodes.

When producing large-sized electric machines, in particular turbo- and hydraulic generators, the most troublesome and labor-consuming operation is the process of manufacturing plain conductors to be employed as rods for stator windings, said process consisting in that the electric wire is unwound from a bundle, straightened, measured into lengths and severed, whereafter the severed lengths thus obtained are skinned.

One prior-art machine for wire cutting and skinning wire ends is known and is intended for treating round-area wires provided with easy-to-strip hose-type insulation. The above-mentioned machine features its wire-cutting and skinning mechanism made as a head adapted to rotate about the wire being treated, said head being provided with two parallel-arranged pairs of stripping blades and a severing blade mounted therebetween. The aforesaid stripping blades are so mounted as to be free to be driven by an actuator cam in a radial direction towards the wire being treated so as to cut in the insulation thereof, whereupon the severing blade is made to operate under the action of another actuator cam.

The machine is at dwell, that is the wire feed is discontinued, for a period of time required for cutting in the insulation, severing the wire and stripping out the insulation.

A disadvantage inherent in the aforementioned machine resides in that it cannot be employed for treating plain conductors used in stator windings of turbo- and hydraulic generators, said conductors having essentially a rectangular area and a varnish-impregnated fibre insulation tightly adhering to the conductor.

Another disadvantage of the above-said machine lies with its intermittent action, that is the wire feed is discontinued while stripping the insulation and severing the wire, which fact adversely affects labor productivity.

It is a general and essential object of the present invention to eliminate the above-mentioned disadvantages.

It is a specific object of the present invention to provide a highly efficient installation for cutting electrical wires and skinning their ends featuring a continuous feed of lengthy wire blanks.

A further object of the present invention is to provide a wire-skinning mechanism capable of treating the wire with both easy-to-strip insulation of the hose type and with the insulation tightly adhering to the wire such as a varnish-impregnated fiberglass insulation, irrespective of whether round- or rectangular-area wires are involved.

According to the invention said object is achieved in an installation for cutting electrical wires and skinning their ends having a mechanism for feeding lengthy wire blanks to the wire-cutting and skinning mechanism and an automatic apparatus to control the latter mechanism, the aforesaid wire feed mechanism being located as viewed in the direction of the wire feed beyond the wire-skinning mechanism which comprises at least two rotatable brushes movable towards the wires being treated in the process of skinning and before the wire-cutting mechanism which is essentially flying shears, said wire-cutting mechanism being operatively associated with said wire feed mechanism and being interlocked by means of an automatic control circuit with said wire-skinning mechanism so that the skinned wire sections are severed.

To provide the possibility of skinning wires having any type of insulation, the brushes of the wire-skinning mechanism are cylindrically shaped, whereas the rotational axes thereof form an acute angle with the direction of the wire feed.

To make it possible to effect wire severing with a continuous feeding of lengthy wire blanks, and to actuate the flying shears, use is made of two operatively associated crank gears arranged on both sides of the plane of the wire movement, whose connecting rods carry blades articulated to said connecting rods preferably in the front portion thereof, said blades being provided with guides to effect parallel motion thereof when cutting.

Other features and many of the attendant advantages of this invention will be readily appreciated as the same becomes better understood by reference to the following detailed description when considered in connection with the accompanying drawings in which like reference numerals designate like parts throughout the FIGS. thereof.

Figure 1:
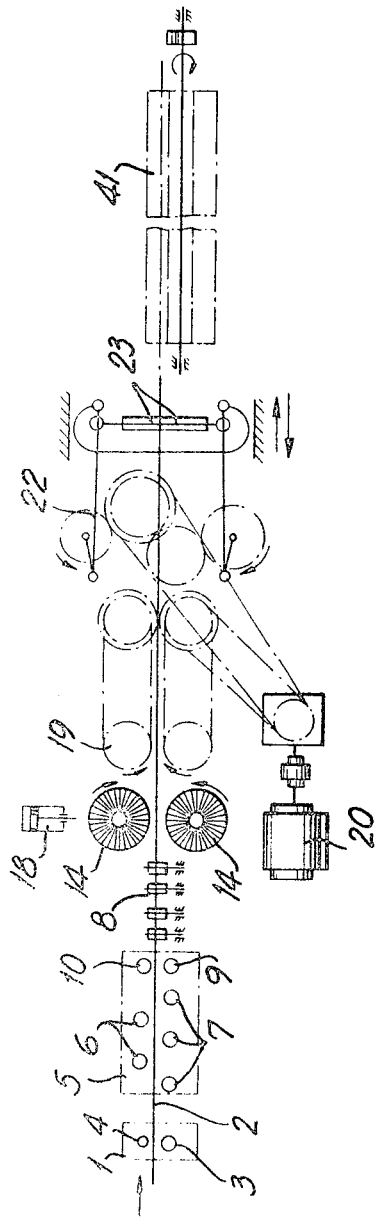
FIG. 1 is a general diagrammatic view of the skeleton diagram of a numerically controlled installation for straightening, cutting and skinning two cross-sectional square-area electrical wire ends, according to the invention.
Figure 2:
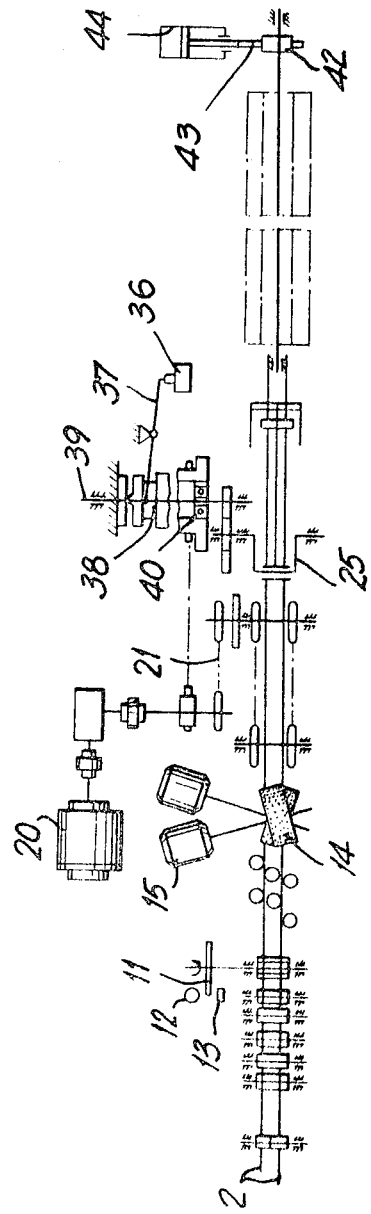
FIG. 2 is a plan view of FIG. 1.

Now referring to FIGS. 1 and 2, the installation according to the invention comprises a safety mechanism 1, capable of delivering a command to disengage the installation should any break or kinkles be revealed in the wires 2 being treated.

The safety mechanism 1 comprises a bottom roller 3 over which the wires being treated are free to slide, and two top rollers 4 which are spring loaded and adapted to press the wires 2 against the bottom roller 3. As soon as any break or kinkles are detected, the top roller moves downwards or upwards, respectively, thereby mechanically actuating the elements to cause them to apply the appropriate signals to the installation control circuit.

To provide straightening of the wires when moving, the installation incorporates a wire straightening mechanism comprising two gangs of straightening rolls, a gang 5 of said rolls being designed for wire straightening in the vertical plane. The rolls in said gang are arranged in two rows, i.e. a top row 6 and a bottom row 7, said rows being staggered with respect to each other so that the rolls of the top row are positioned between those of the bottom row, whereby high-quality wire straightening is obtainable.

Another gang 8 of the rolls is similar to the first one as to its constriction, differing only in that the rotational axes of the rolls therein are arranged in the vertical plane so as to provide for wire straightening in the horizontal plane, each wire being treated with its particular group of rolls.

When treating the wires with their cross-sectional area other than rectangular such as a round one, the effective surface of the rolls may be made to suit the shape of the cross-sectional area of the wires involved.

To measure the length of the wires being treated the installation is provided with a wire length measuring device comprising one calibrated roller 9 and two spring-loaded rollers 10 so as to separately press each of the wires 2 against the calibrated roller 9.

A disc 11 is set on the spindle of the calibrated roller 9, said disc being provided with radial slots evenly spaced apart round the entire periphery thereof. A lamp 12 and a photocell 13 are provided on both sides of the disc 11, both of the former making up a photosensitive pickup electrically connected to a wire length measuring device incorporated in the circuit of the installation program control device. Both the calibrated roller 9 and the disc 11 are made to rotate by virtue of frictional forces arising when the wires 2 are moving, so that the disc 11 with its teeth crosses the light ray passing from the lamp 12 to the photocell 13, whereby the numerical data on the wire length are converted into electrical signals which are then delivered from the photosensitive pickup to the wire length measuring device.

Figure 4:
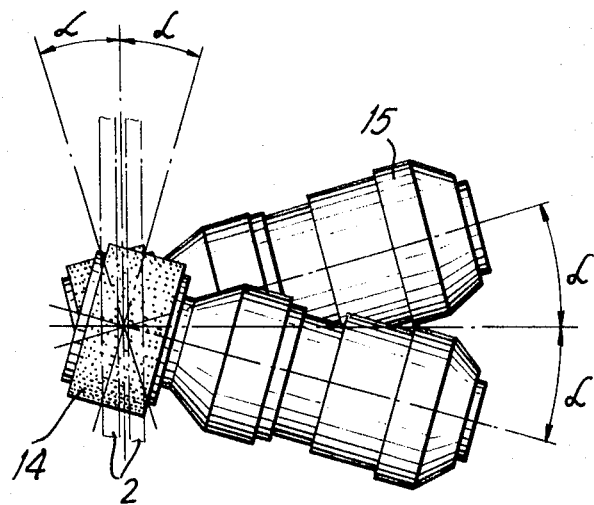
FIG. 4 is a diagram showing the arrangement of the brushes with respect to the direction of wire feed.
Figure 3:
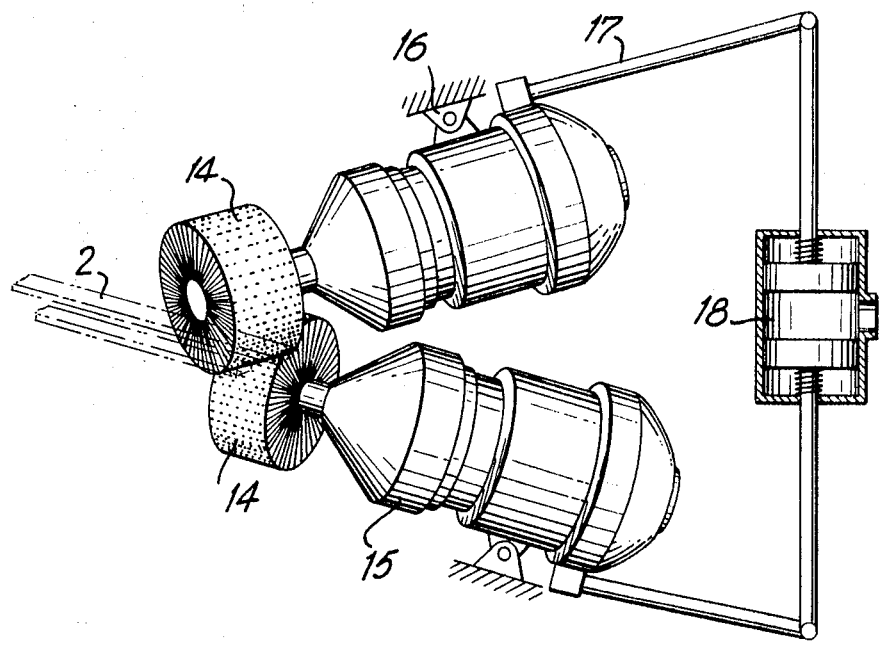
FIG. 3 is a schematic diagram of the wire-skinning mechanism.

To provide for the skinning of the wire ends in the installation involved, its wire-skinning mechanism (FIG. 3) is furnished with two cylindrically shaped wire brushes 14 fitted over the shafts of electric motors 15 which are arranged on both sides of the plane of location of the wires being treated. The motors 15 complete with the brushes 14 are placed into a closed chamber provided with an exhaust ventilation. The axes of the motors 15 are arranged in a horizontal plane at a prescribed acute angle $\alpha$ with respect to the direction of feed of the wires 2, the direction of action of the brushes 14 making up the same angle $\alpha$ therewith. The arrangement of the brushes 14 at the angle $\alpha$ to the direction of the wires 2 being treated is necessary to obtain high-quality skinning of both the principle (wider) sides and lateral sides thereof (FIGS. 3 and 4), at the same time making the brush wear more uniform, the value of said angle being assumed to be most favorable within the range of from 10° to 30°.

The electric motors 15 are mounted on hinges 16 and by means of levers 17 are connected to a pneumatic actuator 18, which is adapted to operate upon receiving an appropriate command from said wire-measuring device to cause the electric motors to turn about the hinges 16 which results in the brushes 14 approaching each other until contacting the wires 2 to stay in that position for a while, so as to simultaneously skin both of said wires on all the four sides thereof.

This done, the pneumatic actuator is disengaged, the electric motors 15 are returned to the initial position and the brushes 14 are moved apart.

A mechanism 19 to feed the wires 2 is made essentially as two bush roller chains of the caterpillar type provided with rubber or plastic liners or plates to ensure better contact with the wires 2. The wire feed mechanism 19 is imparted motion from a controlled drive 20 via a bush-and-roller chain 21.

Figure 5:
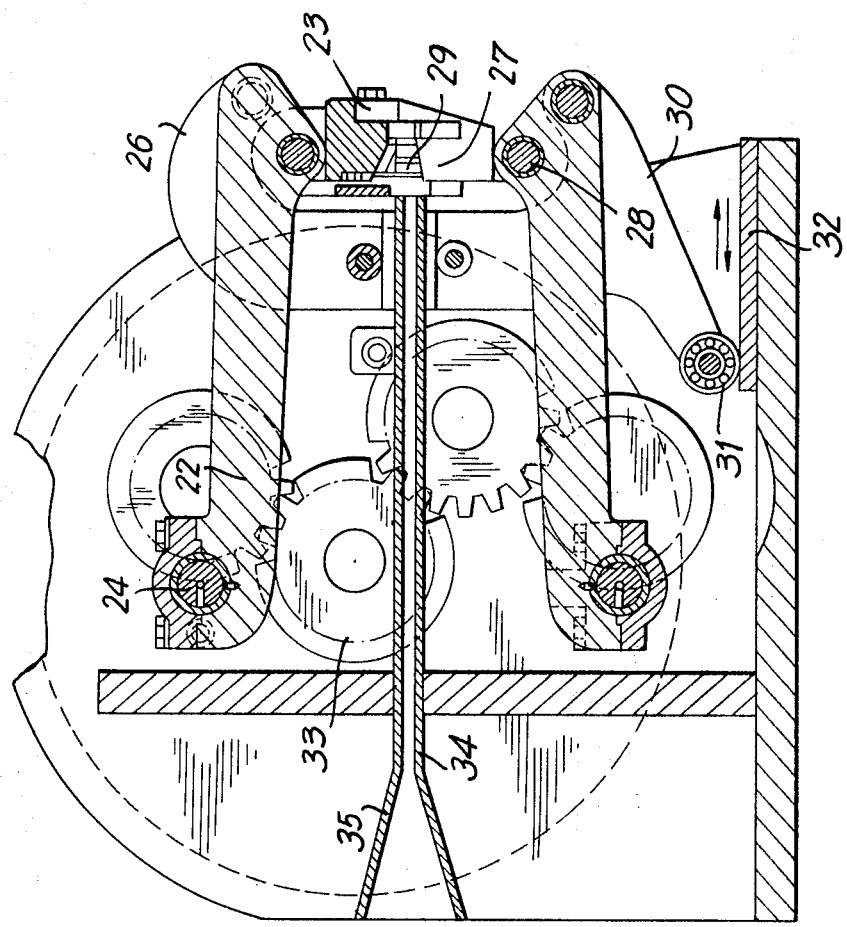
FIG. 5 is a schematic diagram of the wire-cutting mechanism.

The wire-severing mechanism (FIG. 5) is made as flying shears which are essentially two crank gears, whose connecting rods 22 carry blades 23. With one of their ends, the connecting rods 22, are articulated to cranks 24 of crankshafts 25 which are adapted to rotate in opposite directions, and with the other end, to two parallel-arranged cheeks 26. The blades 23 are fixed in position on members 27 which are coupled to the ends of the connecting rods 22 through pivots 28, whereas said members 27 are provided with guides 29 for the blades to move parallel in the wire-cutting process. To ensure that the cheeks 26 be more stable, these are provided with a supporting projection carrying a roller 31 which is adapted to roll over a guide plane 32. Rotation of the crankshafts 25 (FIG. 2) is imparted from the common drive 20 through gear trains 33. With the crankshafts 25 rotating in opposite directions the connecting rods 22 are free to reciprocate, whereby the blades 23 are simultaneously moved towards each other and in the direction of the wire feed. The rotational speed of the crankshafts 25 is assumed to be such that the speed of the blades 23 in the direction of the wire feed, while cutting, be the same as the speed of the wire traversing. The wires 2 having been severed by the blades 23, the latter are moved apart and, while moving forward together therewith, force the wire into a receptacle. Severing of the wires is effected at the midpoint of the skinned portion thereof. The cutting process is controlled by a command coming from the program control device. Having performed one complete operational cycle, that is severing of the wires 2, the flying shears are disengaged and the connecting rods 22 are returned into the initial position. To eliminate slackening of the wires 2, provision is made in the interior of the wire-cutting mechanism for a guide through 34 with a flare 35 on the side where the wires are passed into said trough.

Both engaging and disengaging of the flying shears (FIG. 2) are accomplished through the use of an electromagnet 36 which is adapted to operate upon a command arriving from the program control device to actuate a semiclutch 38 through a lever 37, said semiclutch being set on a specially shaped shaft 39, wherefrom rotation is imparted via a gear train 33 to the crankshafts 25. Another semiclutch 40 loosely mounted on the same shaft 39, is under constant rotation which is imparted thereto from the drive 20. The engagement of both of said semiclutches causes the shaped shaft 39 to rotate, wherefrom rotation is translated through the gear train 33 to the two crank gears actuating the blades 23.

To receive the severed lengths of wire, the machine is provided with a three-position receiving device which is essentially a pivotally mounted drum 41 carrying three longitudinally arranged trays or troughs opened outwards and spaced at an angle of 120° apart, around the periphery of said drum. The wires 2 after having been severed by the flying shears, are moved along one of the trays or troughs of the drum 41, which is in the topmost position until the process of cutting the wires 2 is completed. Just as the wire severing is completed, the drum 41 turns around its axis through 120°, whereas the wires 2, while moving from the flying shears, move into a second vacant tray or trough so that when the top trough containing the wires 2 cut in lengths is in the bottommost position, said wire lengths are free to fall down from the trough on the table located under the drum 41.

To effect turning of the drum 41, an overrunning clutch 42 with a star pinion is mounted on the drum shaft, said clutch being driven from a pneumatic cylinder 49 via a rack-and-pinion drive.

All the mechanisms of the installation involved are arranged in series on a common bed. The pivotable drum 41, due to its considerable length, is kept against swagging by means of auxiliary brackets which, in turn, are fixed in their positions on a foundation baseplate.

Thus, the entire operation cycle of the installation is as follows. The wires 2 unwound from the bundles (not shown in the drawings) are passed successively through the safety mechanism 1, the wire-straightening mechanisms 5 and 8, the wire length measuring device, the skinning mechanism, the wire feed device 19 and the wire-cutting device; the skinning and cutting procedures being performed upon arrival of a corresponding command from the program control device. The severed wire lengths with the skinned ends are delivered to the receptacle 41.

To automatically control all the mechanisms mentioned above, the installation incorporates the program control system, whereby the wire-cutting and skinning operations are performed according to a preset program.

We claim:

1. Apparatus for cutting electric wires and skinning the wire ends, said apparatus comprising wire feed means for feeding lengthy wire blanks, wire-cutting means, wire-skinning means and means for automatically controlling said cutting and skinning means, said wire feed means being interposed between said skinning means and said cutting means, said skinning means comprising at least two rotatable brushes adapted for engaging the wires to skin said wires, said cutting means being operatively associated with said wire feed means, said automatic control means, and with the wire-skinning means such that the wire-cutting means is both transversely of, and parallel to, the direction of feed of the wire to sever the skinned wire portions as the wire is continuously fed.

2. Apparatus as claimed in claim 1, wherein the brushes of the wire-skinning means are cylindrically shaped, and have rotational axes constituting an acute angle with the direction of the wire feed.

3. Apparatus as claimed in claim 1 wherein said cutting means includes two operatively associated crank gears arranged one on each of the opposite sides of the plane of motion of the wires being treated, said crank gears including connecting rods and blades articulated thereto, and further including guides to effect parallel motion of said blades, transversely of said wire, when cutting.

4. Apparatus as claimed in claim 2 wherein said cutting means includes two operatively associated crank gears arranged one on each of the opposite sides of the plane of motion of the wires being treated, said crank gears including connecting rods and blades articulated thereto, and further including guides to effect parallel motion of said blades, transversely of said wire, in the wire-cutting process.

5. Apparatus as claimed in claim 4, wherein said cutting means includes means defining a channel for guiding said wire to said blades.

6. Apparatus as claimed in claim 5, wherein said means defining a channel includes a flared end portion constituting the inlet thereof for receiving said wire.

7. Apparatus as claimed in claim 4, wherein said cutting means includes means defining a channel for guiding said wire to said blades.

8. Apparatus as claimed in claim 7, wherein said means defining a channel includes a flared end portion constituting the inlet thereof for receiving said wire.

9. Apparatus as claimed in claim 3, including actuating means for actuating said cutting means, said actuating means comprising electromagnetic means, a lever pivotally supported between the ends thereof, said lever including opposite end portions, one of said end portions being operatively associated with said electromagnetic means, and means operatively associated with the other end portion of said lever for operating said cutting means.

10. Apparatus as claimed in claim 4, including actuating means for actuating said cutting means, said actuating means comprising electromagnetic means, a lever pivotally supported between the ends thereof, said lever including opposite end portions, one of said end portions being operatively associated with said electromagnetic means, and means operatively associated with the other end portion of said lever for operating said cutting means.